Dec. 17, 1929.   W. F. SPECK   1,740,274
COTTON HARVESTER
Filed March 2, 1928   4 Sheets-Sheet 3

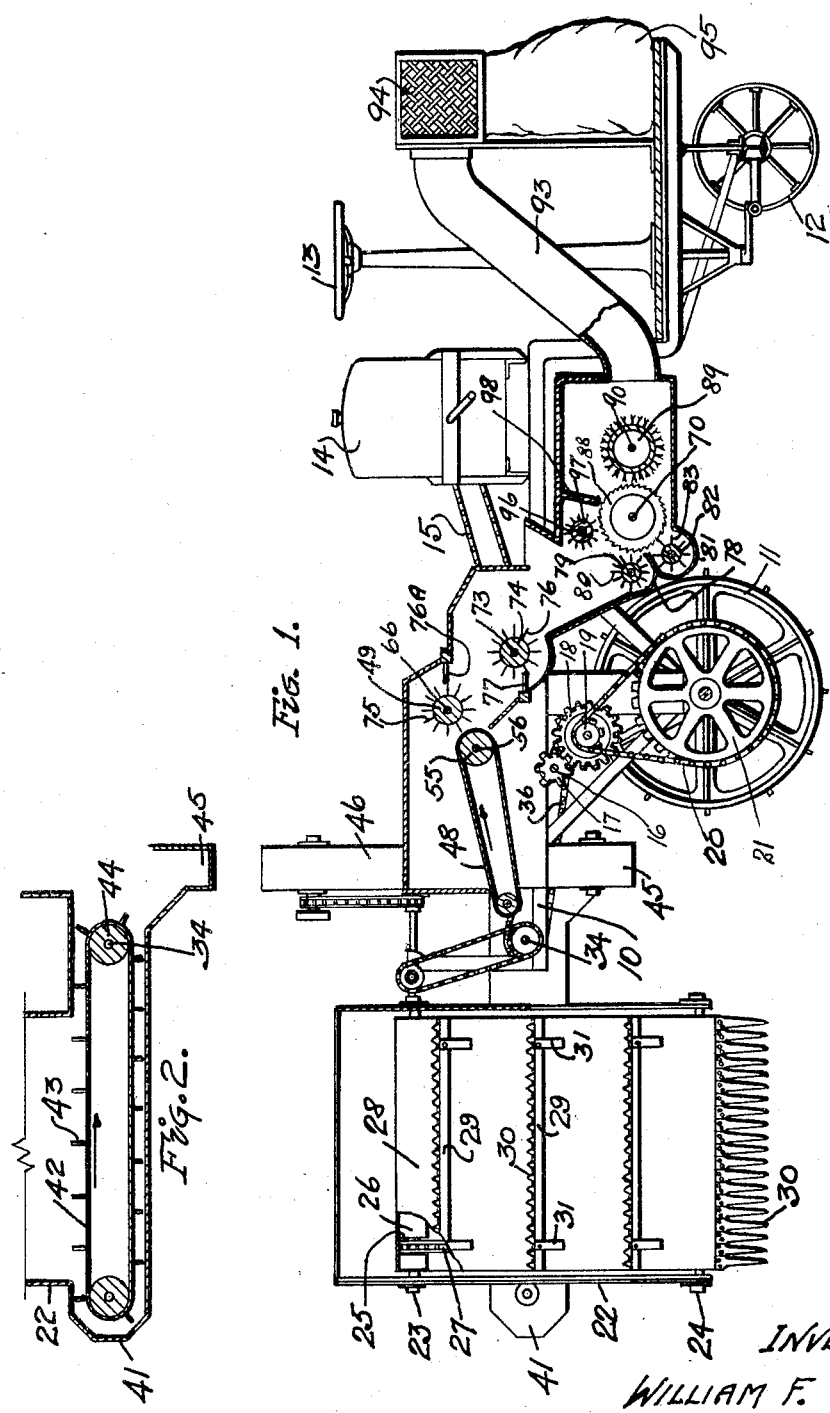

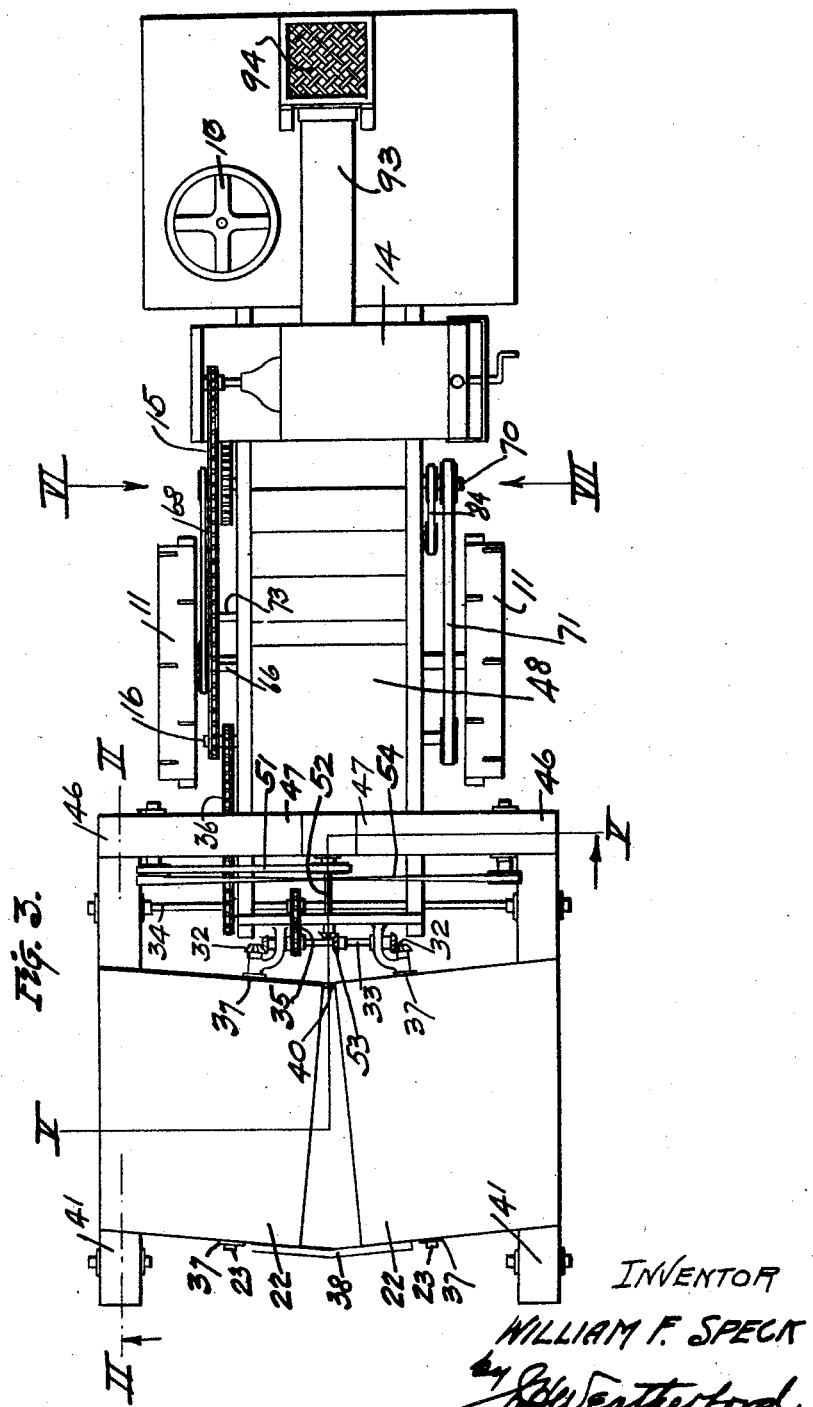

INVENTOR.
WILLIAM F. SPECK
by
J. H. Weatherford
ATTORNEY.

Dec. 17, 1929.  W. F. SPECK  1,740,274
COTTON HARVESTER
Filed March 2, 1928   4 Sheets-Sheet 4
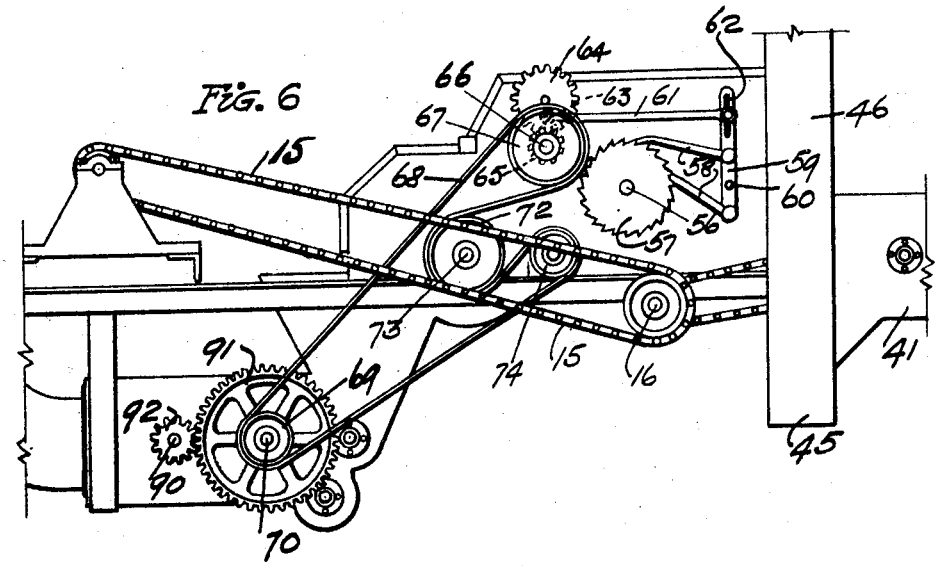
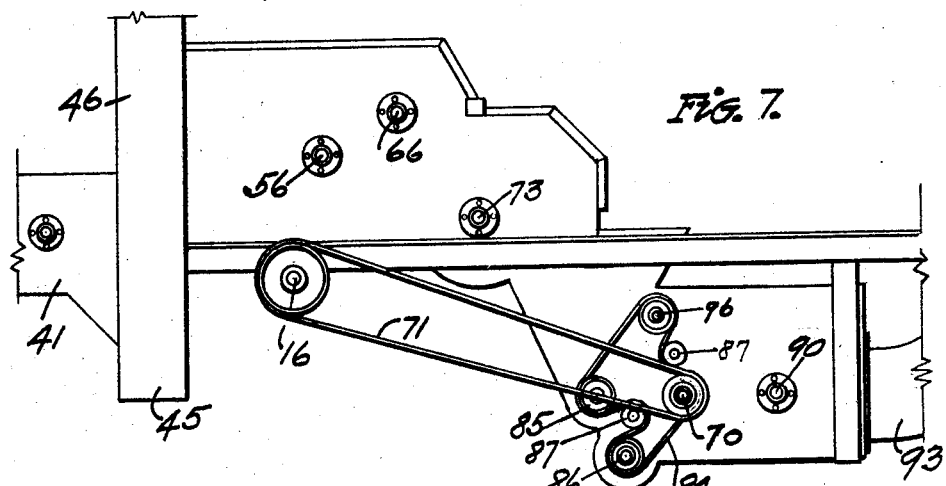
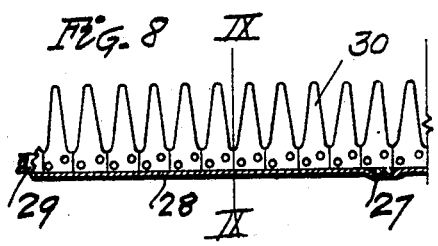
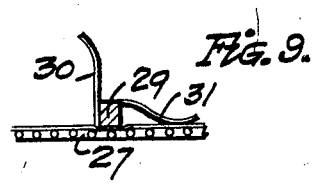
INVENTOR.
WILLIAM F. SPECK
by J. H. Weatherford
ATTORNEY.

Patented Dec. 17, 1929

1,740,274

UNITED STATES PATENT OFFICE

WILLIAM F. SPECK, OF MEMPHIS, TENNESSEE

COTTON HARVESTER

Application filed March 2, 1928. Serial No. 258,487.

My invention relates to an improvement in machines for harvesting cotton and has especial relation to a machine in which the bolls are stripped from the plant along with the cotton and thereafter the cotton is separated from the bolls so that only the cotton need be carried to the gin, and the bolls and other trash may be left in the field.

The objects of my invention are:

(a) To provide a self-contained machine which may be drawn or propelled along the rows of cotton, which will strip the bolls from the plant; which will transfer and deliver them to a beating means, which will strip the cotton from the bolls after such beating and will deliver the cotton into a receptacle;

(b) To provide means for efficiently removing the bolls from the plants;

(c) To provide means for breaking up the bolls and stripping the cotton therefrom;

(d) To generally improve the design and construction of such a machine.

The means by which the foregoing and other objects are accomplished will readily be understood from the following specification on reference to the accompanying drawings, in which:

Fig. 1, is a sectional side elevation of the machine taken on the approximate center line thereof;

Fig. 2, is a sectional detail taken on the line II—II of Fig. 3, showing one of the conveyors;

Fig. 3, is a plan of the machine;

Fig. 6, is a fragmentary side elevation of the machine looking in the direction of the arrow VI in Fig. 3;

Fig. 7, is a fragmentary side elevation looking the direction of the arrow VII in Fig. 3;

Fig. 8, is a fragmentary enlarged plan of the stripper finger assembly; and

Figure 4:
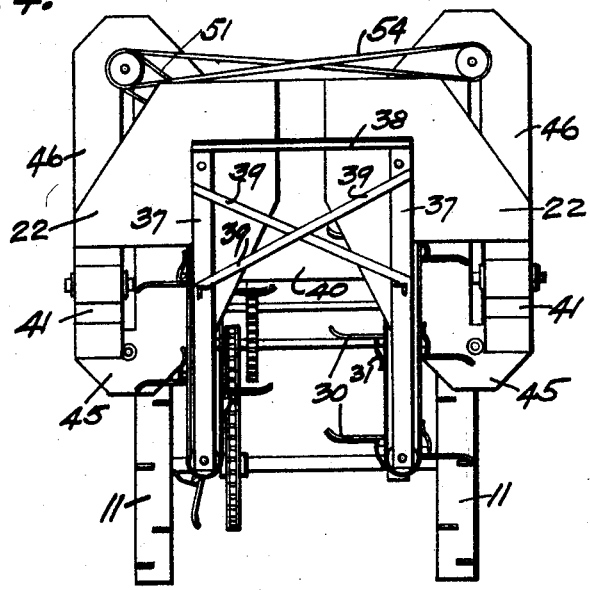
Fig. 4, is a front elevation.
Figure 5:
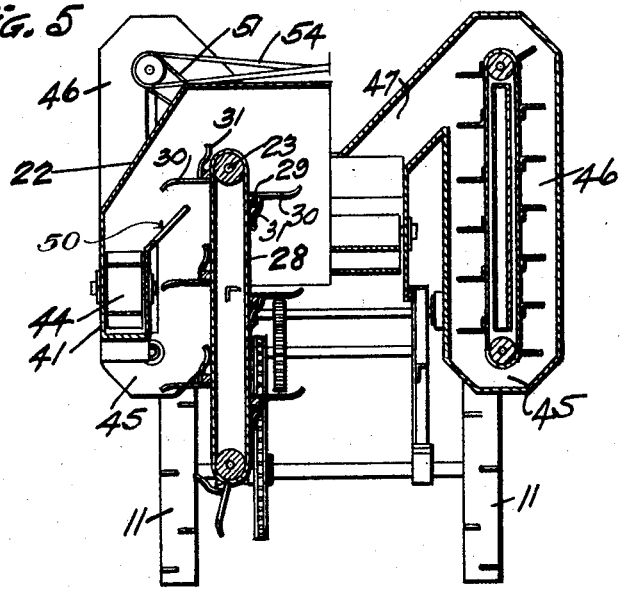
Fig. 5, is a section on the line V—V of Fig. 3 looking in the direction of the arrows.

Fig. 9, a section on the line IX—IX of Fig. 8.

Referring now to the drawings in which the various parts are indicated by numerals; 10 is the frame of the machine, which frame is carried by a pair of driving wheels 11 and by a pair of trailer wheels 12, which trailer wheels are steered by a steering wheel 13.

14 indicates a power plant for the machine. This plant preferably is mounted directly on the frame 10, and through a sprocket chain 15 drives a counter-shaft 16 from which the power is transmitted to various parts of the mechanism.

17 is a pinion on the shaft 16, meshing with the gear 18, which drives the sprocket pinion 19 and, through the sprocket chain 20 and sprocket wheel 21, actuates the driving wheels 11 to propel the machine forward.

At the front of the machine are two oppositely disposed stripper units, each of which comprises a casing 22, which carries upper and lower shafts 23 and 24. Each of these shafts carries sprocket gears 25, located inside the casing near each side thereof, and a belt roller 26. 27 are sprocket chains disposed over the sprocket wheels 25, and 28 is a belt disposed over the rollers 26. 29 are cross bars which extend from chain to chain, with the ends secured thereto. Secured to the upper surface of these crossbars are stripper fingers 30, which fingers are preferably cut from thin spring metal and are preferably of substantially the shape shown in plan in Fig. 8, and which, as there shown, are preferably closely assembled one against the other. 31 are bracing members which are secured to the front of the crossbars 29, which members extend downward along the front of the chains 27 and bear thereagainst to prevent the overturning of the crossbars and the fingers carried thereby.

The upper shafts 23 are driven at their rear ends by pairs of beveled gears 32, from a cross-shaft 33, which shaft in turn is driven from the shaft 34 through the chain 35. 36 is a sprocket chain through which the shaft is driven from the countershaft 16.

It will be especially noted that the casings 22 of the stripper units are disposed at an angle to the longitudinal center line of the machine so that the forward edges of these casings are further apart than the rear edges thereof, whereby the stripper fingers approach closer together toward the rear. The stripper units each discharge into a belt conveyor immediately in the rear thereof.

Forming a part of the casings 22, are members 37 which extend therebelow and in which the lower shafts 24 are journalled. The front pair of these members and the front of the units themselves are secured together and braced by the cross member 38 and the diagonal braces 39. At the rear the plate 40 is continuous and forms the rear portion of both casings.

The belt conveyors each comprise a horizontally disposed casing 41, in which a horizontal belt 42, having flights 43 thereon, is disposed. The upper portion of this belt is driven rearwardly (in the direction of the arrow Fig. 2) by a belt pulley 44 mounted on the shaft 34, and discharges into the boot 45 of an elevator 46 by which the cotton is raised. This elevator discharges through the spout 47 onto a conveyor belt 48 by which belt the cotton bolls are transferred rearwardly to a beater 49.

50 are fingers secured to the upper portion of the conveyor casings 41, which fingers are adapted to receive the cotton bolls from the stripper fingers 30 and divert them into the conveyor casing. The fingers 50 are disposed and spaced so that they pass between the stripper fingers 30, and remove therefrom any bolls or lint which may have caught and hung thereon.

One of the elevators 46, is driven by a belt 51 from a shaft 52, which shaft in turn is driven from the shaft 33, by a pair of bevel gears 53. The opposite elevator is driven by a crossed belt 54 from the first mentioned elevator.

The rear end of the conveyor belt 48, is disposed over a pulley 55, which is secured to a shaft 56, to which shaft a ratchet wheel 57 is also secured. This ratchet wheel is driven by ratchet pawls 58 which are actuated, through an arm 59 journalled on a pin 60, by a connecting rod 61. One end of this rod is connected to the slotted end 62 of the arm 59, so that by moving the rod end downward or upward, the stroke of the ratchet pawls 58 may be shortened or lengthened as the case may be. The other end of the rod 61 is carried by a crank pin 63, on a gear 64, which gear meshes with a pinion 65 on the shaft 66. Secured on the shaft 66 is a belt pulley 67 which is driven through a belt 68 from a belt pulley 69 secured to the saw shaft 70, which shaft in turn is driven from the shaft 16, through the belt 71.

The belt 68 additionally drives a belt pulley 72 which pulley is secured on a shaft 73. 74 is an idler.

Mounted on and secured to the shafts 66 and 73 respectively, are beaters 49 and 74, having beater teeth or spikes 75, 76 which respectively pass between fixed sets of spikes 76A, 77.

The discharge from the beater 49 passes to the beater 74 and from this beater to a housing 78, in which housing a conveyor 79 having the usual spiral flight is disposed, this flight however is made up of spirally disposed spikes 80.

Disposed below the conveyor housing 78, is a second housing 81, in which housing a conveyor 82 is disposed, the flight of this conveyor being likewise formed of spikes 83 spirally disposed. Preferably these two conveyors are similar in every respect, except that they have oppositely pitched flights, so that one of the conveyors transfers the material disposed therein as from left to right, whereas the other reverses the operation and transfers the material from right to left.

The conveyors 79 and 82 are driven from the saw-shaft 70 by a belt 84, which belt passes over pulleys 85 and 86 disposed on the shafts of the beaters 79 and 82 respectively. 87 are idlers. This belt also drives a shaft 96 on which is mounted a combing roller 97. 98 is a baffle plate.

The saw-shaft 70 is disposed parallel to the conveyors 79 and 82 and preferably equidistant therefrom. Disposed on the shaft 70 are a number of gin-saws 88, which saws just clear the ends of the conveyor spikes 80 and 83.

Adjacent the saw assembly is a brush 89 which is mounted on a shaft 90 and is driven from the shaft 70 at a relatively high speed through the gear 91 and the pinion 92, the direction of rotation being, on account of the gear drive, opposite to that of the saw.

The discharge from the brush 89 is thrown outward and upward by the brush through a chute 93 to a collecting box 94 from which it passes by gravity into a sack 95, which sack may be removed and replaced when full.

In use the machine is propelled along the cotton rows with the stripper units disposed on either side of the plants. The stripper belts moving upward adjacent the plants draw the stripper fingers vertically therethrough, removing the bolls with the lint attached and carry them upward over the upper belt pulley. After passing the upper belt pulley the bolls are discharged into the horizontal conveyors on the two sides of the machine and by these conveyors are transferred rearwardly to the elevators which raise them and discharge them on to the central conveyor belt 48. This belt moves the bolls rearwardly at a speed which may be regulated by adjusting the stroke of the ratchet arms and drives the bolls to the upper beater 49. This beater carries the bolls over and breaks them up against the fixed set of fingers 76A, after which the bolls drop and are again broken up against the fingers 77, by the beaters 74. Thus prepared the bolls pass downward to the conveyors 70 by which they are traversed in proximity to the saws 88, which saws remove at this time the greater proportion of the lint. At the end of this conveyor they are again traversed along the face of the saws which remove the remaining lint.

The lint carried over by the saws is brushed off by the rapid action of the brush 89 and thrown by this brush upward into the collecting box 94 and from this box drops into the receiving sack 95. As these sacks are filled they are removed and replaced.

Bolls carried with the lint by the saws are thrown backward by the combing roller 97 into the conveyor 79 and bolls passing the combing roller are retained by the baffle plate 98 until they are caught by the combing roller and thrown into the same conveyor.

It will be especially noted that the sides of the box 94 are made of screen wire or other perforated material so that a large amount of the dust and other fine trash collected with the cotton is discharged through the screen.

It will of course be understood that the drawings and descriptions are illustrative only and that much of the detail of the machine may be deviated from without departing from the spirit of my invention. I wish it distinctly understood therefore that I do not intend to limit myself to the details shown, except as same may be specifically set out in the claims.

Having described my invention, what I claim is:

1. In a cotton harvester, oppositely disposed stripper units, having their rear ends adjacent, and their forward ends spaced apart, said units each comprising a casing, upper and lower shafts journalled in said casing, sprocket wheels and a belt pulley on each of said shafts, a belt over said pulleys, sprocket chains over said sprocket wheels, a plurality of cross bars secured to said chains, a plurality of stripper fingers secured to said cross bars and projecting outward substantially at right angles to said belt, and a pair of bracing members, secured to each of said bars and downwardly disposed along said chains.

2. In a cotton harvester, oppositely disposed stripper units, having their rear ends adjacent and their forward ends spaced apart, said units each comprising a casing, upper and lower shafts journalled in said casing, sprocket wheels and a belt pulley on each of said shafts, a belt over said pulleys, sprocket chains over said sprocket wheels, a plurality of cross bars secured to said chains, a plurality of elastic stripper fingers secured to said cross bars and projecting outward, substantially at right angles to said belt, and a pair of bracing members, secured to each of said bars and downwardly disposed along said chains.

3. In a cotton stripper unit having sprocket chains adapted to carry stripper fingers, finger units, each comprising a rectangular bar extending across between said chains and secured adjacent its ends to said chains, a plurality of fingers, each having a broad base and tapering therefrom substantially to its end, with said bases closely assembled on and secured to one face of said bar, said fingers projecting beyond said bar, and braces aligning with said chains, secured to a face of said bar at right angles to said fingers and extending therefrom along said chains.

In testimony whereof I hereunto affix my signature.

WILLIAM F. SPECK.